United States Patent
Binotto et al.

(10) Patent No.: US 11,645,598 B2
(45) Date of Patent: May 9, 2023

(54) COGNITIVE EVALUATION OF SENSOR ENVIRONMENTS AND RESOURCE ALLOCATION

(71) Applicant: International Business Machines Corporation, Armonk, NY (US)

(72) Inventors: Alecio Pedro Delazari Binotto, Munich (BR); Carlos Henrique Cardonha, São Paulo (BR); Jose Luis Spagnuolo Sobrinho, Alpharetta, GA (US); Samir Nassif Palma, São Paulo (BR)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 16/795,716

(22) Filed: Feb. 20, 2020

(65) Prior Publication Data

US 2021/0264451 A1    Aug. 26, 2021

(51) Int. Cl.
| | |
|---|---|
| G06Q 10/0631 | (2023.01) |
| G06Q 30/0204 | (2023.01) |
| G06F 16/35 | (2019.01) |
| G06Q 30/0202 | (2023.01) |
| G06F 18/23 | (2023.01) |

(52) U.S. Cl.
CPC ....... *G06Q 10/06315* (2013.01); *G06F 16/35* (2019.01); *G06F 18/23* (2023.01); *G06Q 30/0202* (2013.01); *G06Q 30/0205* (2013.01)

(58) Field of Classification Search
None
See application file for complete search history.

(56) References Cited

U.S. PATENT DOCUMENTS

| | | | |
|---|---|---|---|
| 5,913,917 | A | 6/1999 | Murphy |
| 6,643,567 | B2 | 11/2003 | Kolk et al. |
| 7,188,076 | B2 | 3/2007 | Bensemana |
| 8,070,062 | B2 | 12/2011 | Goel et al. |

(Continued)

FOREIGN PATENT DOCUMENTS

| | | |
|---|---|---|
| CN | 102078790 A | 6/2011 |
| CN | 102512146 A | 6/2012 |

(Continued)

OTHER PUBLICATIONS

Yu, "E-commerce logistics in supply chain management," 2017, Industrial Managements & Data Systems, vol. 117, No. 10, pp. 2263-2286 (Year: 2017).*

(Continued)

*Primary Examiner* — Ivan R Goldberg
(74) *Attorney, Agent, or Firm* — Patterson + Sheridan, LLP

(57) ABSTRACT

Techniques for data evaluation and optimized resource allocation are provided. Usage data is received collected from at least one sensor in a physical location, where the usage data indicates consumption of an item. The usage data is aggregated within a predefined cluster, where the predefined cluster corresponds to a geographic area. Future consumption of the item is predicted based at least in part on evaluating the usage data using one or more cognitive models. A recommended reconfiguration of one or more aspects of production for the item is generated, based on the predicted future consumption.

20 Claims, 7 Drawing Sheets

(56) References Cited

U.S. PATENT DOCUMENTS

| | | | |
|---|---|---|---|
| 8,600,572 B2 | 12/2013 | Sri-Jayantha | |
| 2002/0188499 A1* | 12/2002 | Jenkins | G06Q 10/087 705/28 |
| 2004/0093175 A1 | 5/2004 | Tan | |
| 2004/0148217 A1* | 7/2004 | Lauring | G06Q 10/08 705/7.33 |
| 2004/0230470 A1 | 11/2004 | Svilar et al. | |
| 2013/0332238 A1* | 12/2013 | Lyle | G06Q 30/0201 705/7.34 |
| 2014/0032268 A1* | 1/2014 | Kruglick | G06Q 30/0202 705/7.31 |
| 2014/0266669 A1 | 9/2014 | Fadell et al. | |
| 2014/0324532 A1* | 10/2014 | Ghosh | G06Q 30/0202 705/7.31 |
| 2015/0294333 A1 | 10/2015 | Wegliano et al. | |
| 2016/0140588 A1* | 5/2016 | Bracewell | G06Q 30/0204 705/7.33 |
| 2017/0039885 A1 | 2/2017 | Flores et al. | |
| 2017/0109687 A1* | 4/2017 | Kamadolli | G06Q 30/0201 |
| 2017/0278053 A1* | 9/2017 | High | G06Q 10/087 |
| 2017/0364872 A1* | 12/2017 | Rodoni | G06Q 10/06315 |
| 2018/0012166 A1* | 1/2018 | Devadas | G06Q 10/06315 |
| 2018/0144292 A1* | 5/2018 | Mattingly | G06Q 10/087 |
| 2019/0266554 A1* | 8/2019 | Lin | G06Q 30/0202 |

FOREIGN PATENT DOCUMENTS

| | | |
|---|---|---|
| CN | 202397452 U | 8/2012 |
| CN | 204009524 U | 12/2014 |
| CN | 204044876 U | 12/2014 |
| CN | 204733187 U | 10/2015 |
| CN | 204990383 U | 1/2016 |
| CN | 109066670 A | 12/2018 |
| WO | 2002077917 A1 | 10/2002 |
| WO | 2014131005 A2 | 8/2014 |

OTHER PUBLICATIONS

Jagtap et al., "Unlocking the Potential of the Internet of Things to Improve Resource Efficiency in Food Supply Chains," Jan. 2019, In International Conference on Information and Communication Technologies in Agriculture, Food & Environment, Springer, pp. 287-301 (Year: 2019).*

Poulami Singha Roy, "How Connected Consumer Products Could Help Reduce Food Waste," Nov. 27, 2018, IoTZone News, 7 pages.

Shravan Nagarajan, "Revolutionizing the Food Supply Chain with IoT,"infosys.com, 3 pages [Accessed Online Oct. 12, 2019].

Xiaorong et al., "The Design of the Internet of Things Solution for Food Supply Chain," 5th International Conference on Education, Management, Information and Medicine (EMIM 2015), 5 pages.

Heather Brown, "The Internet of Things and the Future of Food," Apr. 29, 2016, foodindustryexecutive.com [Accessed Online Oct. 12, 2019].

"IBM TRIRIGA Building Insights delievers new AI-driven capabilities to understand space utilization across real estate portfolios using IoT sensing technologies, including wifi network data," IBM United States Software Announcement, dated Jan. 28, 2020, pp. 1-7.

* cited by examiner

| ITEM | METRIC | DAY 1 | | DAY 2 | | DAY 3 | | DAY 4 | | DAY 5 | | DAY 6 | | DAY 7 | |
|---|---|---|---|---|---|---|---|---|---|---|---|---|---|---|---|
| | | IN | OUT | IN | OUT | IN | OUT | IN | OUT | IN | OUT | IN | OUT | IN | OUT |
| MEAT | kg | 2 | 0 | 0 | 1 | 0 | 1 | 0 | 0 | 0 | 0 | 2 | 0 | 0 | 1 |
| GRAINS | kg | 5 | 1 | 0 | 2 | 0 | 1 | 0 | 0 | 1 | 1 | 0 | 0 | 1 | 1 |
| FRUITS | UNIT | 6 | 6 | 0 | 0 | 0 | 0 | 0 | 0 | 3 | 3 | 0 | 0 | 2 | 2 |
| VEGETABLES | kg | 1 | 0 | 0 | 0 | 0 | 0 | 1 | 1 | 1 | 1 | 1 | 0 | 0 | 1 |
| BEVERAGES | LITER | 3 | 1 | 0 | 0 | 0 | 1 | 0 | 1 | 0 | 0 | 1 | 1 | 0 | 0 |
| PERSONAL CARE | UNIT | 2 | 0 | 0 | 1 | 0 | 1 | 0 | 0 | 0 | 0 | 2 | 0 | 0 | 1 |
| CLEANERS | LITER | 5 | 1 | 0 | 2 | 0 | 1 | 0 | 0 | 1 | 1 | 0 | 0 | 1 | 1 |
| DAIRY | kg | 6 | 6 | 0 | 0 | 0 | 0 | 3 | 0 | 3 | 3 | 0 | 0 | 2 | 2 |
| CANNED | UNIT | 1 | 0 | 0 | 0 | 0 | 0 | 0 | 1 | 1 | 1 | 1 | 0 | 0 | 1 |

*Fig. 3A*

COGNITIVE EVALUATION OF SENSOR ENVIRONMENTS AND RESOURCE ALLOCATION

BACKGROUND

The present disclosure relates to cognitive computing, and more specifically, to utilizing cognitive computing to evaluate sensor data in various environments.

Existing production and distribution systems have a large number and variety of elements that must work together to provide resources where they are needed and when they are needed. In existing systems, there is a significant gap between the knowledge of resource consumers and providers, and resource providers are frequently not able to optimally determine resource demand with any significant granularity. In typical deployments, the only information available to resource providers are orders/purchases, which gives a consolidated and imprecise view of actual regional consumption.

SUMMARY

According to one embodiment of the present disclosure, a method is provided. The method includes receiving usage data collected from at least one sensor in a physical location, wherein the usage data indicates consumption of an item, and aggregating the usage data within a predefined cluster, wherein the predefined cluster corresponds to a geographic area. The method further includes predicting future consumption of the item based at least in part on evaluating the usage data using one or more cognitive models. Additionally, the method includes generating a recommended reconfiguration of one or more aspects of production for the item, based on the predicted future consumption.

According to a second embodiment of the present disclosure, a computer program product is provided. The computer program product comprises one or more computer-readable storage media collectively containing computer-readable program code that, when executed by operation of one or more computer processors, performs an operation. The operation includes receiving usage data collected from at least one sensor in a physical location, wherein the usage data indicates consumption of an item, and aggregating the usage data within a predefined cluster, wherein the predefined cluster corresponds to a geographic area. The operation further includes predicting future consumption of the item based at least in part on evaluating the usage data using one or more cognitive models. Additionally, the operation includes generating a recommended reconfiguration of one or more aspects of production for the item, based on the predicted future consumption.

According to a third embodiment of the present disclosure, a system is provided. The system includes one or more computer processors, and one or more memories collectively containing one or more programs which, when executed by the one or more computer processors, performs an operation. The operation includes receiving usage data collected from at least one sensor in a physical location, wherein the usage data indicates consumption of an item, and aggregating the usage data within a predefined cluster, wherein the predefined cluster corresponds to a geographic area. The operation further includes predicting future consumption of the item based at least in part on evaluating the usage data using one or more cognitive models. Additionally, the operation includes generating a recommended reconfiguration of one or more aspects of production for the item, based on the predicted future consumption.

BRIEF DESCRIPTION OF THE SEVERAL VIEWS OF THE DRAWINGS

FIGS. 3A and 3B depict techniques for collecting and evaluating usage data, as well as visualizing past data and predicted values, according to one embodiment disclosed herein.

DETAILED DESCRIPTION

Figure 1:
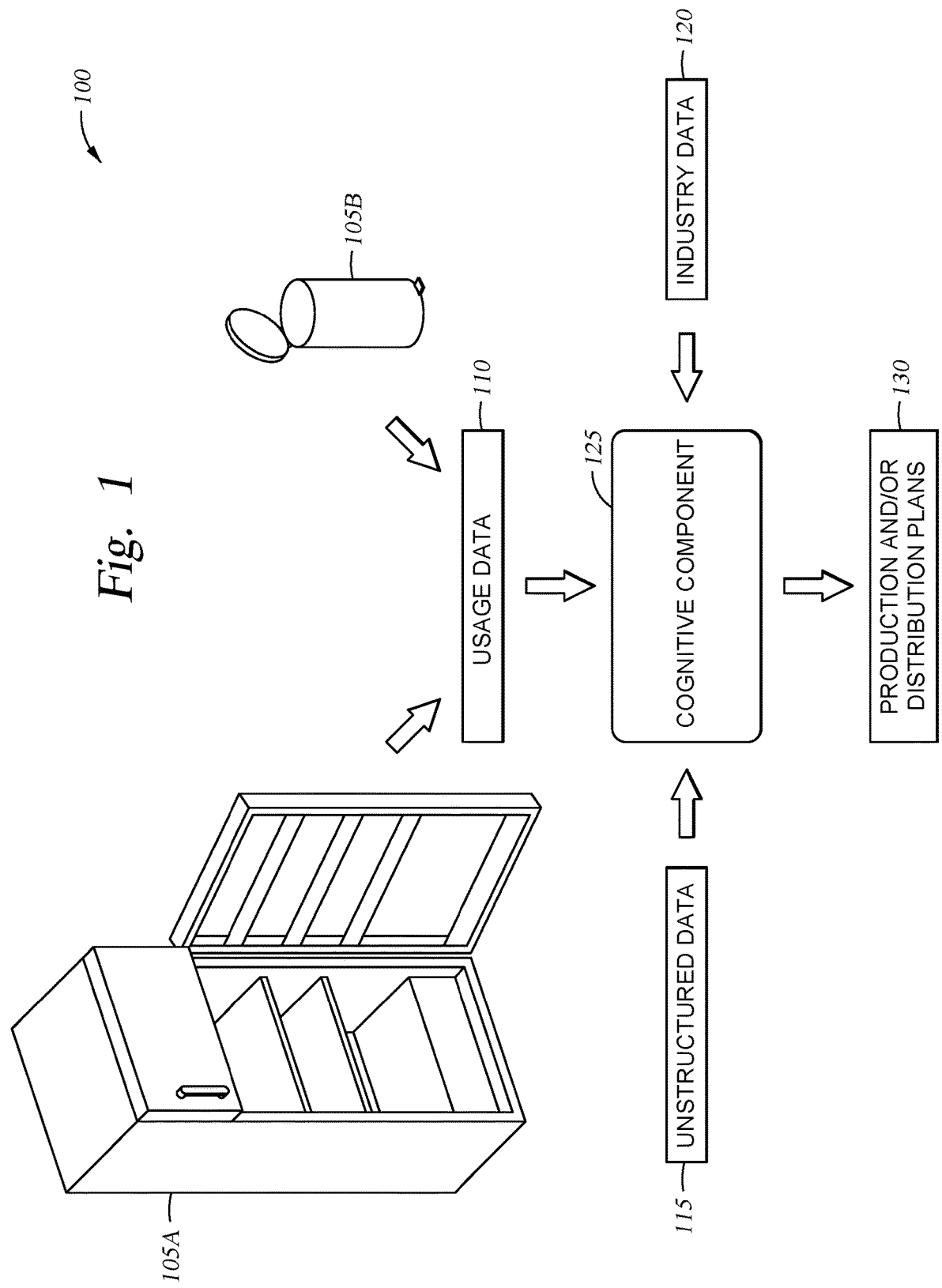
FIG. 1 depicts a workflow for utilizing usage data to reconfigure resource production and/or distribution based on cognitive analysis, according to one embodiment disclosed herein.

Embodiments of the present disclosure provide techniques for collecting and evaluating a wide variety of data to provide improved resource allocations that ensure needs are met and waste is reduced. A key challenge faced by industry today is the lack of visibility between production and actual regional demand. That is, the imprecise information available about actual usage prevents entities from obtaining optimized production and distribution plans. From the perspective of those that use the resources, sub-optimal production and distribution systems significantly increase the required efforts, and can lead to less than desirable results.

Some embodiments of the present disclosure provide an Internet of things (IoT) based information processing system that reduces this misalignment. In one embodiment, an environment is instrumented to capture items input and output from the environment. This environment can include, for example, a smart kitchen in a restaurant, a home, and the like. In some embodiments, the system then utilizes these sensors to automatically determine and/or estimate the type and the quantity of relevant items (which may or may not be limited to a predefined list of items) which are present in the environment. This information can be employed by a cognitive system (along with, in some embodiments, other structured and unstructured data, such as produced by other entities in the supply chain) in order to adjust the production planning (e.g., how many if each item should be manufactured) as well as the distribution planning (e.g., how many items should be sent to each retailer, and when those items should arrive).

Additionally, in some embodiments, the system integrates unstructured data (e.g., collected via social media platforms) provided by the consumer. For example, a user may indicate an event (such as a birthday party) at a specific time and/or place, along with an indication of friends or individuals who will attend. Similarly, in some embodiments, weather data such as atmospheric forecasts, which can affect consumer behavior, are also considered.

In at least one embodiment, the system can evaluate this variety of data and provide real-time or near real-time feedback for dynamic reconfiguration of production and/or distribution. In some embodiments, the system enables and improves collaborative intelligence by linking into a distributed ledger, such as a blockchain based solution, to store data. For example, in one such embodiment, the supply chain may be integrated into a blockchain network to store data in an immutable way.

In some examples discussed herein, households and neighborhoods are used as example environments in which embodiments of the present disclosure may be implemented. The present disclosure is not limited to these examples, however. In various embodiments, the system can operate in other environments such as an ecosystem of businesses, restaurants, and/or buildings. In one such embodiment, the system can operate to aid reconfiguration of the restaurant/business supply chain, such as to reduce food waste. Similarly, in some embodiments, the system can dynamically respond to crisis events such as natural disasters, and aid resource allocation decisions based on the resources currently available in given regions and households.

FIG. 1 depicts a workflow 100 for utilizing usage data to reconfigure resource production and/or distribution based on cognitive analysis, according to one embodiment disclosed herein. In the illustrated workflow 100, a number of Sensor Devices 105A-B in an environment provide Usage Data 110 to a Cognitive Component 125. In the illustrated embodiment, the Sensor Devices 105 include a refrigerator (105A) and a trash receptacle (105B). Although depicted as smart devices, in some embodiments, standalone sensors can be utilized. Further, although two Sensor Devices 105 are depicted in the illustrated embodiment, there may of course be any number of Sensor Devices 105 in a given environment.

Additionally, there may be any number of separate environments with associated Sensor Devices 105. For example, in one embodiment, the environment corresponds to a restaurant/kitchen (either in a commercial setting, or in a private domicile). There may be any number of such kitchens that similarly have their own Sensor Devices 105 and report Usage Data 110 to the Cognitive Component 125. The Sensor Devices 105A-B generally include any sensor configured to obtain data from the environment. For example, in various embodiments, the Sensor Devices 105 can include radio frequency identifier (RFID) sensors, cameras or other imagery sensors, weight sensors, barcode scanners, and the like.

In one embodiment, each Sensor Device 105 collects and reports Usage Data 110 about its contents, and/or other contents of the environment. For example, the Usage Data 110 from the Sensor Device 105A (a smart fridge) may indicate what items are currently in the fridge, when they were added, a quantity of the item, and the like. In some embodiments, the Sensor Device 105A similarly reports when items are removed from it. As another example, the Usage Data 110 from the Sensor Device 105B (a trash can) may include indications of items thrown away into the can, when the items were deposited, and the like.

The Usage Data 110 generally represents possession and/or consumption data for the environment. This can include indicating when and in what quantity particular items enter the environment (e.g., by being placed in the fridge) and exit the environment (e.g., by being removed from the fridge and/or by being thrown away). In the illustrated embodiment, the Cognitive Component 125 can receive and evaluate this data. In some embodiments, the Usage Data 110 can first be anonymized and/or aggregated prior to evaluation. For example, the usage Data 110 may indicate the general region where it was collected (e.g., a neighborhood or other geographic area), without specifying particular Sensor Devices 105 and/or users.

In one embodiment, the Cognitive Component 125 aggregates the Usage Data 110 with respect to a number of predefined regions, in order to estimate overall usage and demand for each respective region. In some embodiments, the Cognitive Component 125 further receives Unstructured Data 115. In at least one embodiment, the Unstructured Data 115 includes data from one or more social media platforms. For example, the Unstructured Data 115 may indicate upcoming events, participants, user preferences, and the like. In some embodiments, the Cognitive Component 125 similarly receives weather data and/or climate data indicating the weather for each region.

Based on the Usage Data 110 and/or Unstructured Data 115, the Cognitive Component 125 can generate a predicted or estimated resource usage for any number of items, with respect to each of the defined regions. For example, the Cognitive Component 125 may estimate the number of eggs that will be consumed in a given neighborhood based on prior usage and current quantities of eggs in the region (e.g., indicated by the Usage Data 110), preferences of users in the region and future events in the region (e.g., indicated in the Unstructured Data 115), weather data (which may be correlated with egg consumption in the region), and the like. In embodiments, the Cognitive Component 125 can thereby estimate current and/or future usage for any number of resources with granularity with respect to the timing of the consumption (e.g., when the resources will be used) and the location of the consumption (e.g., which regions the consumption will occur in). In an embodiment, based on this data, the Cognitive Component 125 can learn consumption patterns over time with respect to each item and region.

In an embodiment, the Industry Data 120 includes information about the production and/or distribution of resources for any number of regions. For example, the Industry Data 120 may indicate the quantity of each item that will be produced in a given timeframe, the location of these items, and the like. Similarly, the Industry Data 120 may indicate the planned distribution of the items, including when they will be shipped, to where they will be shipped, what retailers in each region will receive items, and the like.

Using the Industry Data 120, the Cognitive Component 125 can determine the resource allocations at future points in time, and compare these actual planned allocations with the estimated consumption demand. If there is a misalignment, the Cognitive Component 125 generates one or more Production and/or Distribution Plans 130 to remedy or reduce the misalignment. For example, the Cognitive Component 125 may suggest to distribute additional inventory of a particular item at a given time to one or more enterprises located in a given region, based on predicting that consumption of that item will increase at the given time in the given region. The Cognitive Component 125 can generally suggest increased and/or reduced production, modified distribution, and the like. In some embodiments, the Cognitive Component 125 can affirmatively implement the generated recommendations, rather than merely suggesting them.

Figure 2:
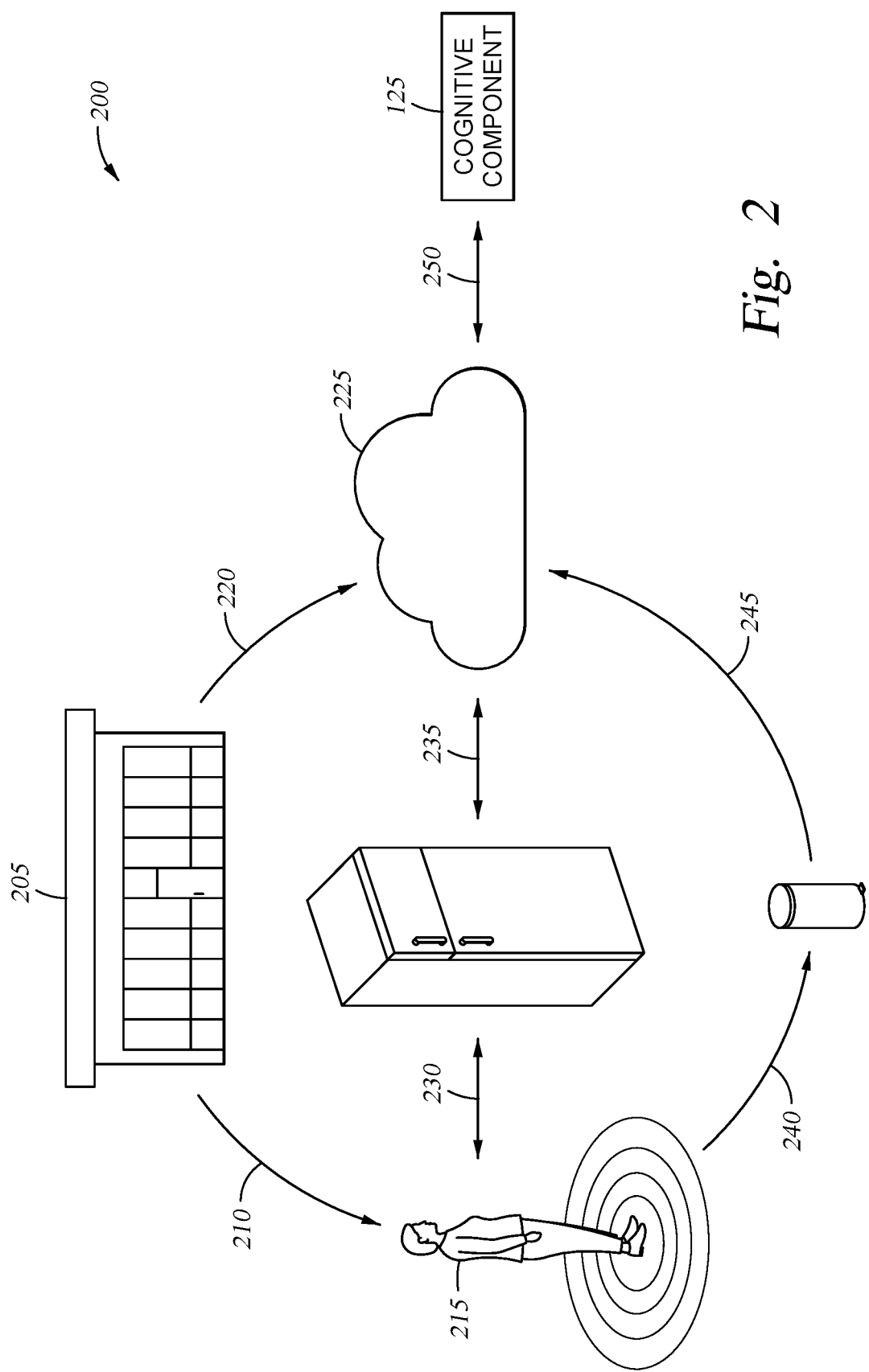
FIG. 2 depicts a workflow for collecting usage data to aid a cognitive system in reconfiguring resource production and/or distribution, according to one embodiment disclosed herein.

FIG. 2 depicts a workflow 200 for collecting usage data to aid a cognitive system in reconfiguring resource production and/or distribution, according to one embodiment disclosed herein. In the illustrated embodiment, resources can be acquired (e.g., via purchase) at a Retailer 205. In the illustrated embodiment, each Retailer 205 can thereafter generate and report one or more logs or records to the Cognitive Component 125 via a Network 225 (e.g., the Internet). This is indicated by the arrow 220. Generally, these reports indicate the item(s) purchased, the quantities purchased, and/or the region/area/location of the Retailer 205. In some embodiments, the logs are transmitted to the Cognitive Component 125 when the purchase occurs. In other embodiments, the logs are transmitted in batches (e.g., hourly, daily, and the like) and each record indicates the date and/or time of the corresponding resource purchase.

As illustrated by arrow 210, Individuals 215 can acquire a variety of items. Individuals 215 may refer to individual people, entities (e.g., businesses and other organizations), and the like. As indicated by arrow 230, the newly-acquired items are then stored or otherwise ingested into the environment. This can include, for example, placing the item in a refrigerator or pantry equipped with one or more sensors to identify the item and/or quantity being stored (e.g., using RFID, image recognition, weight sensors, and the like). As discussed above, the environment can generally include any number and variety of Sensor Devices 105.

As illustrated by arrow 235, the sensors generally report an "intake" event when an item is received/stored. This record indicates the item and/or quantity being received, the time of the intake, and the like. The intake event represents an item entering the physical environment (e.g., the household, the restaurant, and the like). This data is reported to the Cognitive Component 125. In the illustrated embodiment, the Individual 215 can also remove items from the environment (as indicated by arrow 240), such as by throwing them away. Similarly to the intake event, in embodiments, one or more sensors can also report "outgoing" or "consumption" events, indicated by arrow 245. These consumption records generally specify the item, quantity, and/or time of consumption, and indicate that the item has left the environment and/or been consumed. Although depicted as discrete components for conceptual clarity, in some embodiments, a single sensor device may report both intake and consumption of items.

Figure 3B:
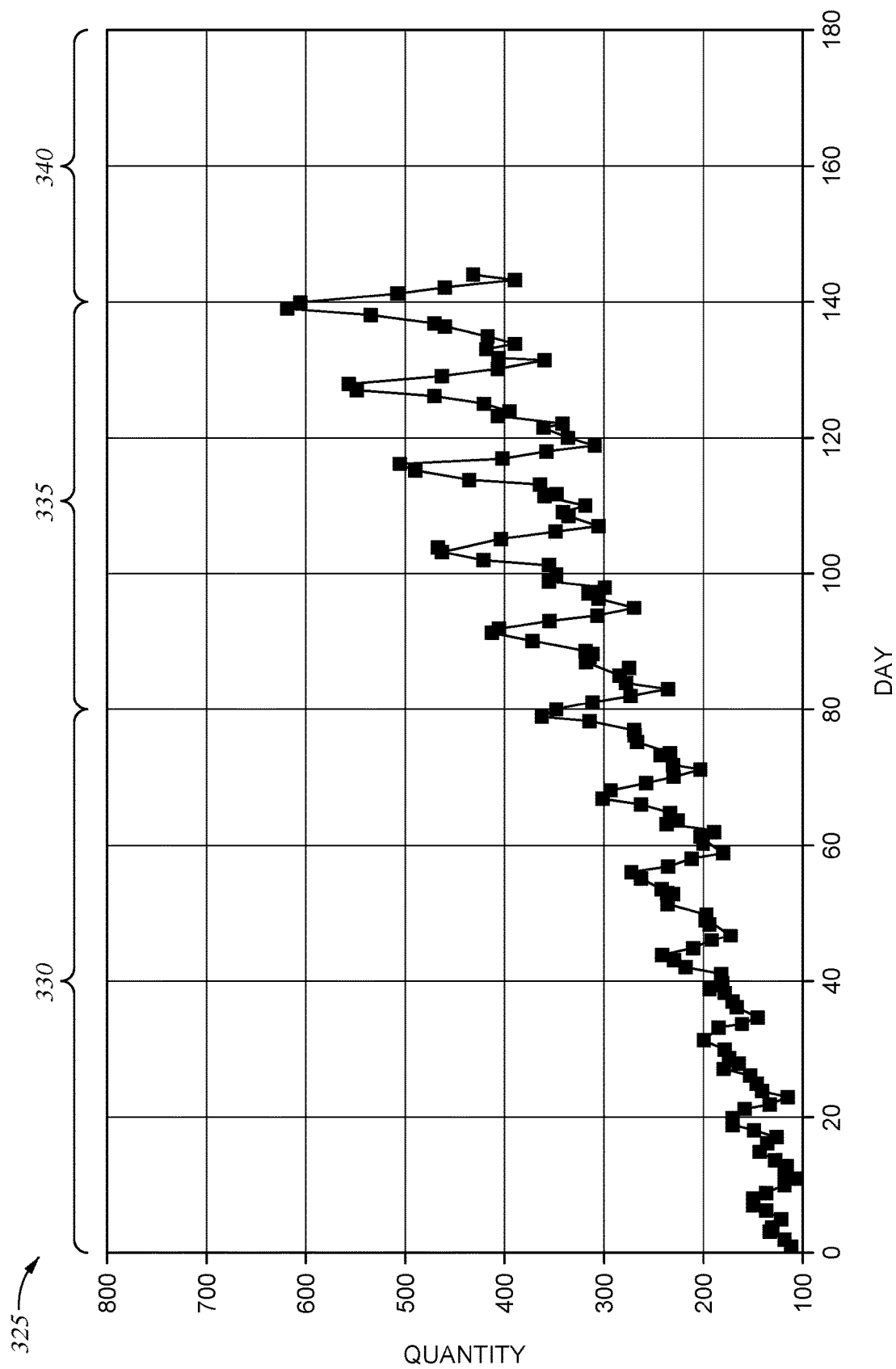

FIGS. 3A and 3B depict techniques for collecting and evaluating usage data, as well as visualizing past data and predicted values, according to one embodiment disclosed herein. In the illustrated embodiment of FIG. 3A, resource consumption and utilization for a given environment/region is depicted in a chart 305. The column 310 indicates the item, while the column 312 indicates the corresponding metric for the item (e.g., the unit used to quantify the item). The chart 305 includes data for a number of Items 315, including "meat" and "grains." Of course, the Items 315 are included as examples, and are in no way limiting on the present disclosure.

The chart 305 includes a number of columns 320 to specify the acquisition and consumption of each item for a number of days. For example, as indicated, the sensors for the environment or region reported acquisition of two kilograms of meat on day one, and zero kilograms of consumption. On day two, one kilogram of meat was consumed. Further, on day three, another one kilogram of meat was consumed. The chart 305 may include data collected from a single environment (e.g., a single kitchen), or an aggregation of a number of environments in a geographic region.

The data reflected in the chart 305 generally indicates the records/logs maintained by the Cognitive Component 125. In embodiments, the data may or may not be organized using a chart 305 or other data structures, and may simply be maintained as a set of records. As depicted in the illustrated graph of FIG. 3B, this data can be used to identify patterns and trends in the resource utilization. In the depicted embodiment, consumption of the item has been increasing over time. Further, the usage tends to surge and recede on a regular and predictable interval. In embodiments, these patterns may be far more complex, and may depend on other variables including local weather conditions, scheduled events, local preferences, and the like.

As illustrated, the consumption of a particular Item 315 in a particular region are visualized on the graph 325. The day (or other temporal measure) is depicted on the horizontal axis, while the quantity is depicted on the vertical axis. As illustrated, the graph 325 indicates usage data for a broader region (e.g., a neighborhood), and reflects how the item consumption changes over time. The first portion of the trend line (indicated by reference 330) corresponds to an initial period where the Cognitive Component 125 collected data and began to evaluate it to estimate trends/patterns.

During a second phase (indicated by reference 335), the Cognitive Component 125 begins generating estimates/predictions/forecasts for the item, and comparing the predictions to the actual consumption once the data is acquired. Finally, as indicated by reference 340, the Cognitive Component 125 can then proceed to predict future consumption. Using these predictions, in embodiments, the Cognitive Component 125 can identify misalignments between estimated consumption and planned supply for the region. The system can then identify remedies to obviate these misalignments and ensure that the available resources in the location align more closely with the desired consumption for each moment in time.

Figure 4:
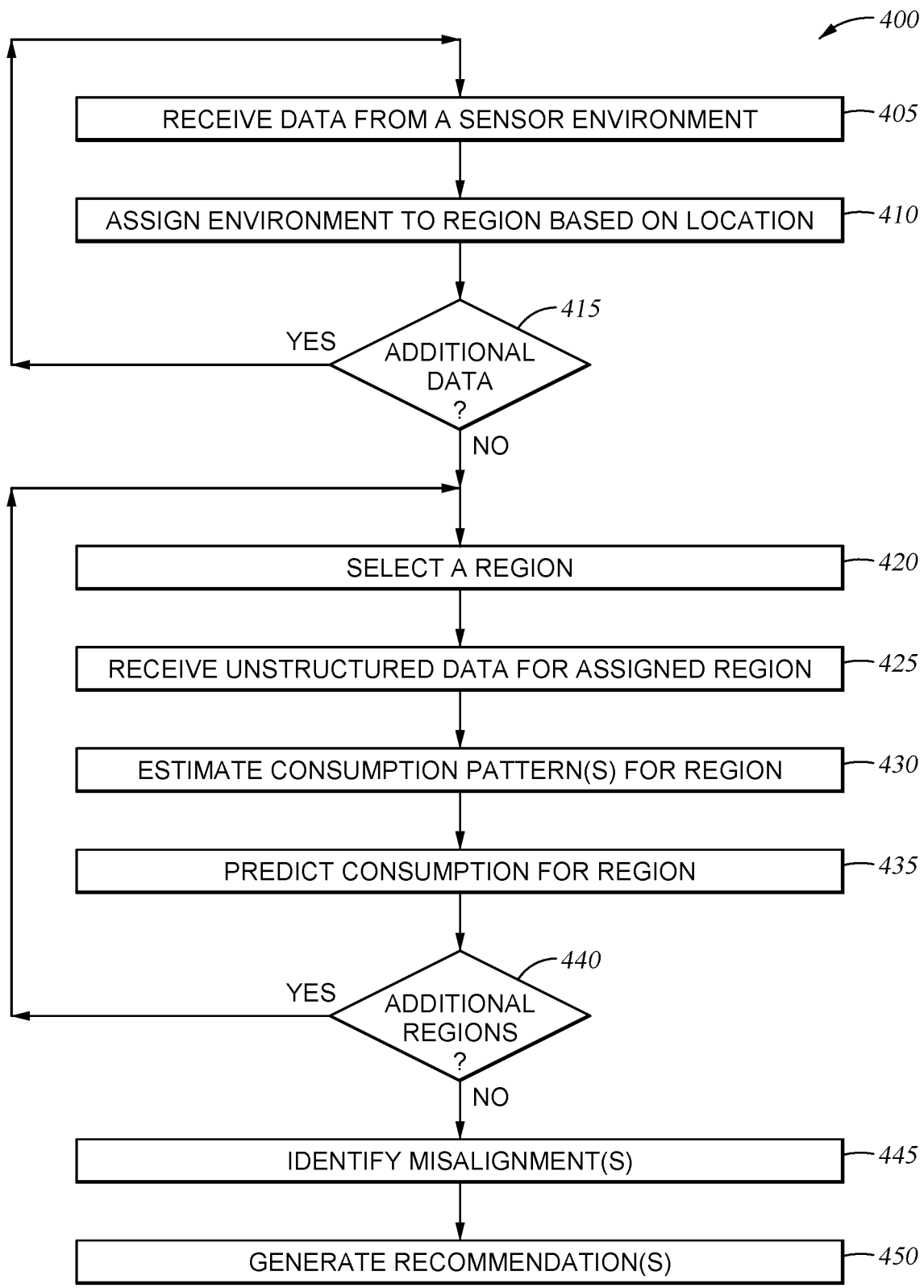
FIG. 4 is a flow diagram illustrating a method for collecting and evaluating data to identify misalignments and optimizations, according to one embodiments disclosed herein.

FIG. 4 is a flow diagram illustrating a method 400 for collecting and evaluating data to identify misalignments and optimizations, according to one embodiments disclosed herein. The method 400 begins at block 405, where a cognitive system receives data from one or more sensors in an environment. At block 410, the cognitive system assigns the environment and data to a geographic region, based on a location of the sensor. For example, the cognitive system determines a location where the data was collected, and identifies the predefined region to which the location belongs. The cognitive system can then assign or otherwise associate the received data with this region, to allow for data aggregation.

The method 400 then continues to block 415, where the cognitive system determines whether additional data has been received or is expected. In some embodiments, the cognitive system can collect data for a predefined period of time (e.g., for an hour) and periodically evaluate the recently collected data for the period (e.g., once per day). If more data is expected prior to beginning the evaluation, the method 400 returns to block 405. Otherwise, the method 400 continues to block 420.

At block 420, the cognitive system selects one of the predefined regions for analysis. The method 400 then continues to block 425, where the cognitive system receives or identifies unstructured data associated with the selected region. As discussed above, in some embodiments, the unstructured data can include information from one or more social media platforms. For example, the unstructured data may indicate upcoming events in the region, such as parties, conferences, and the like. The method 400 proceeds to block 430, where the cognitive system determines/estimates consumption patterns for the region, based on the received sensor data and/or the unstructured data. In some embodiments, the cognitive system further considers weather data or other information.

For example, the cognitive system can identify patterns indicating that consumption of a particular item tends to increase during weekends, decrease when the weather is cold, and increase when particular events are occurring. In embodiments, the cognitive system can iteratively learn over time and refine its patterns and models as new data is received. The method 400 then continues to block 435, where the cognitive system predicts future consumption for the region for one or more future times.

In some embodiments, this includes estimating future demand at specific points in time (or during specific windows of time). In at least one embodiment, the predictions are based in part on the industry data itself. For example, for resources that can be allocated quickly and easily, the cognitive system may predict the relatively-near future (e.g., in the next week). For resources that require longer to produce and/or distribute, the cognitive system may refrain from making such short-term predictions. Instead, in one such embodiment, the cognitive system can predict consumption on a longer timeframe (e.g., in the next six months).

In an embodiment, this estimation/prediction is performed for each relevant item. In some embodiments, the cognitive system only tracks particular items (e.g., designated by an administrator). In at least one embodiment, the cognitive system can track categories of items, and automatically classify data into the appropriate category. For example, the cognitive system can be instructed to monitor dairy consumption. Upon receiving indications and/or images of items in the space, the cognitive system can analyze them to determine whether they should be included in the dairy category. Once the cognitive system has predicted future consumption of each relevant item for the selected region, the method 400 continues to block 440.

At block 440, the cognitive system determines whether there are any additional regions that need to be evaluated. If so, the method 400 returns to block 420. Otherwise, the method 400 continues to block 445. At block 445, the cognitive system identifies any misalignments between the predicted consumptions for each region and the planned allocations for each region. In one embodiment, this analysis includes identifying particular enterprises (e.g., stores) in each region, and determining an allocation of resources to each enterprise. The cognitive system can then compare these allocations to the predicted consumption, in order to identify shortfalls and excesses.

The method 400 then continues to block 450. At block 450, if any misalignments were identified, the cognitive system generates one or more recommendations to eliminate the (or to reduce their magnitude). As discussed above, in embodiments, these recommendations can include production changes and/or distribution changes. For example, the cognitive system may recommend to allocate additional units of an item to one enterprise/location in a region where the consumption is predicted to exceed supply, and ship fewer units to another location/region where predicted consumption is below supply.

In at least one embodiment, the cognitive system can further suggest production changes. For example, upon determining that there is insufficient quantity to adequately meet the predicted consumption in all regions collectively, the cognitive system may suggest to ramp up production for one or more future times. In some embodiments, these recommendations are generated and supplied to the relevant entities (e.g., producers, distributors, and/or retailers). In at least one embodiment, some or all of the recommendations can be automatically implemented by the cognitive system. For example, the cognitive system may itself modify one or more distribution plans to change the quantity of each item that will be sent to each enterprise in one or more regions. In this way, the cognitive system can better serve expected demand without requiring manual intervention.

Figure 5:
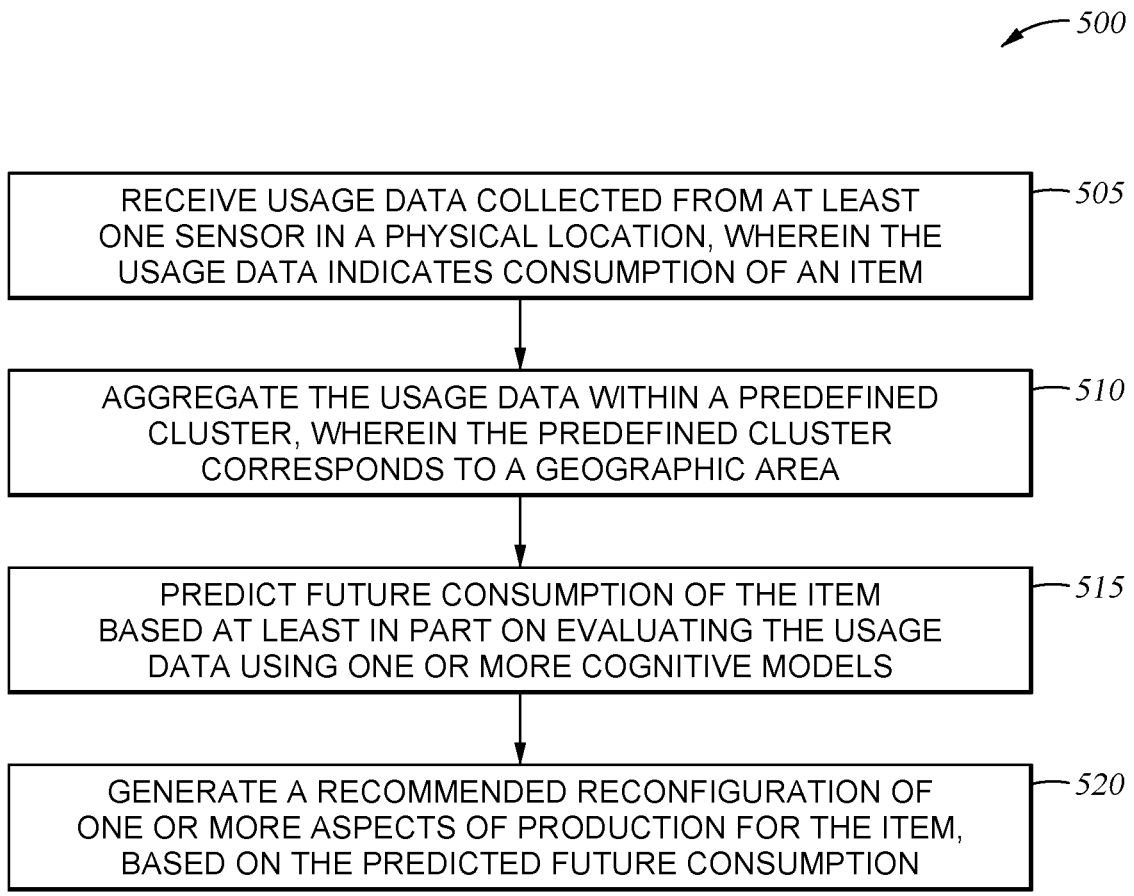
FIG. 5 is a flow diagram illustrating a method for collecting and evaluating usage data, according to one embodiment disclosed herein.

FIG. 5 is a flow diagram illustrating a method 500 for collecting and evaluating usage data, according to one embodiment disclosed herein. The method 500 begins at block 505, where a cognitive system receives usage data collected from at least one sensor in a physical location, wherein the usage data indicates consumption of an item. At block 510, the cognitive system aggregates the usage data within a predefined cluster, wherein the predefined cluster corresponds to a geographic area. The method 500 then continues to block 515, where the cognitive system predicts future consumption of the item based at least in part on evaluating the usage data using one or more cognitive models. Additionally, at block 520, the cognitive system generates a recommended reconfiguration of one or more aspects of production for the item, based on the predicted future consumption.

Figure 6:
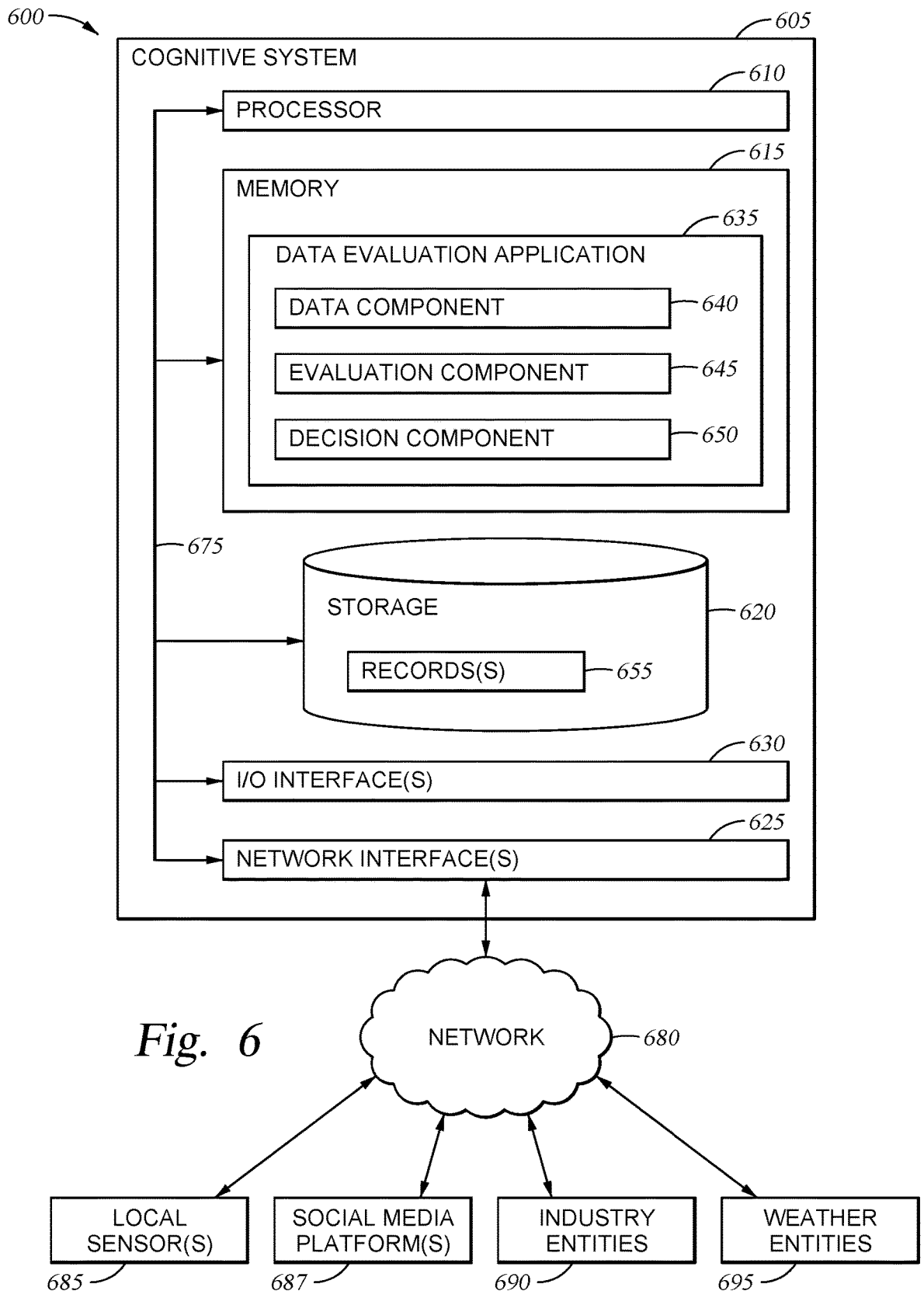
FIG. 6 is a block diagram depicting a cognitive system configured to collect and evaluate a wide variety of data in order to optimize resource allocations, according to one embodiment disclosed herein.

FIG. 6 is a block diagram depicting a Cognitive System 605 configured to collect and evaluate a wide variety of data in order to optimize resource allocations, according to one embodiment disclosed herein. Although depicted as a physical device, in embodiments, the Image Cognitive System 605 may be implemented as a virtual device or service, and/or across a number of devices (e.g., in a cloud environment). As illustrated, the Cognitive System 605 includes a Processor 610, Memory 615, Storage 620, a Network Interface 625, and one or more I/O Interfaces 630. In the illustrated embodiment, the Processor 610 retrieves and executes programming instructions stored in Memory 615, as well as stores and retrieves application data residing in Storage 620. The Processor 610 is generally representative of a single CPU and/or GPU, multiple CPUs and/or GPUs, a single CPU and/or GPU having multiple processing cores, and the like. The Memory 615 is generally included to be representative of a random access memory. Storage 620 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, input and output devices (such as keyboards, monitors, etc.) are connected via the I/O Interface(s) 630. Further, via the Network Interface 625, the Image Cognitive System 605 can be communicatively coupled with one or more other devices and components (e.g., via the Network 680, which may include the Internet, local network(s), and the like). Additionally, the Network 680 may include wired connections, wireless connections, or a combination of wired and wireless connections. In the illustrated embodiment, the Cognitive System 605 is communicatively coupled with one or more Local Sensors 685, Social Media Platform(s) 687, Industry Entities 690, and Weather Entities 695. Further, as illustrated, the Processor 610, Memory 615, Storage 620, Network Interface(s) 625, and I/O Interface(s) 630 are communicatively coupled by one or more Buses 675.

In an embodiment, Local Sensors 685 correspond to sensor devices located in physical environments and configured to collect data about resource consumption in the area, such as a smart fridge, trash can, and the like. Social Media Platform(s) 687 are generally representative of interactive services where users can indicate preferences, events, plans, and the like. Industry Entities 690 are depicted to be generally representative of producers, distributors, and the like. The Industry Entities 690 provide industry data relating to planned and possible production and/or distribution of resources. Further, Weather Entities 695 are generally representative of services or other sources of data relating to the weather and/or climate for one or more regions. This weather data can be used as one input to the cognitive model to improve predictions.

In the illustrated embodiment, the Storage 620 includes a set of Record(s) 655 indicating collected data. In one embodiment, each Record 655 includes logs from one or more Local Sensors 685, and reflect the relevant item(s), event type (e.g., intake/consumption), timing, and the like. In some embodiments, the Records 655 can also include data relating to predicted consumption and/or actual consumption for one or more regions.

The Memory 615 includes a Data Evaluation Application 635. Although depicted as software residing in Memory 615, in embodiments, the functionality of the Data Evaluation Application 635 can be implemented using hardware, software, or a combination of hardware and software. As illustrated, the Data Evaluation Application 635 includes a Data Component 640, an Evaluation Component 645, and a Decision Component 650. Although depicted as discrete components for conceptual clarity, in embodiments, the operations of the Data Component 640, Evaluation Component 645, and Decision Component 650 may be combined or distributed across any number of components and devices.

The Data Component 640 generally receives and/or requests data from one or more sources. This can include Local Sensors 685, Social Media Platforms 687, Industry Entities 690, and/or Weather Entities 695. For example, the Data Component 640 may request and/or receive sensor data from Local Sensors 685. In some embodiments, the sensor data indicates the relevant items and/or event types. In another embodiment, some of the sensor data can include raw data to be evaluated by the Data Component 640. For example, one Local Sensor 685 may transmit data that identifies the resource(s), while another transmits only image data. The Data Component 640 can then evaluate the image data (e.g., using one or more image analysis techniques) to identify and classify the item(s) involved.

In one embodiment, the Data Component 640 can request and/or receive data from the Social Media Platform(s) 687 relating to scheduled events, such as the timing of the event, the location of each event, the type of event, the number of participants, and the like. Further, from the Industry Entities 690, the Data Component 640 can request and/or receive data relating to planned production and distribution of one or more items. Additionally, from the Weather Entities 695, the Data Component 640 can request and/or receive weather forecasts for one or more regions.

The Evaluation Component 645 is generally configured to evaluate the received data using one or more cognitive models in order to predict future resource usage. In some embodiments, this includes utilizing machine learning (ML) to evaluate the data in order to identify patterns and correlations between received input data and actual consumption. The Evaluation Component 645 can then use these trained models to predict future usage, based on current data. Additionally, in an embodiment, the Decision Component 650 compares predicted utilization with planned distribution/production, in order to identify misalignments. If any exist, in embodiments, the Decision Component 650 can generate action plans, including increased production, modified distribution, and the like.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding and/or following, reference is made to embodiments presented in this disclosure. However, the scope of the present disclosure is not limited to specific described embodiments. Instead, any combination of the preceding and/or following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding and/or following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Data Evaluation Application 635) or related data available in the cloud. For example, the Data Evaluation Application 635 could execute on a computing system in the cloud and evaluate a wide variety of data to drive production and distribution plans. In such a case, the Data Evaluation Application 635 could evaluate data to predict future item consumptions, and store these predictions and recommended actions at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
updating, by operation of one or more processors, a cognitive model to predict future consumption of items when new data is received, using machine learning;
receiving, by operation of the one or more processors, usage data collected from at least one sensor in a receptacle located in a physical location, wherein:
the usage data indicates consumption of an item,
the receptacle is used for depositing items for disposal, and
the usage data comprises one or more images captured by the at least one sensor;
evaluating, by operation of the one or more processors, using the cognitive model, the one or more images using one or more image recognition techniques to determine a type of the item and a quantity of the item;
aggregating, by operation of the one or more processors, the usage data within a predefined cluster, wherein the predefined cluster corresponds to a geographic area, and wherein the usage data is anonymized prior to evaluation such that the usage data indicates the geographic area and does not identify the at least one sensor;
receiving, by operation of the one or more processors, social media data indicating a scheduled future event, timing of the scheduled future event, a type of the scheduled future event, and a number of participants for the scheduled future event;
predicting, by operation of the one or more processors, future consumption of the type of item by the cognitive model, based at least in part on evaluating the aggregated usage data and the social media data indicating the scheduled future event using the cognitive model;
generating, by operation of the one or more processors, a recommended reconfiguration of one or more aspects of at least one of production or distribution for the item to reduce misalignments between the predicted future consumption and planned supply for the geographic area; and
automatically facilitating implementation of the recommended reconfiguration, by operation of the one or more processors, to reduce the misalignments, comprising modifying one or more distribution plans to change a quantity of the item that will be sent to one or more enterprises in the geographic area.

2. The method of claim 1, the method further comprising:
receiving unstructured data from one or more social media platforms;
correlating the unstructured data with the aggregated usage data; and
predicting future consumption of the type of item based at least in part on the correlated unstructured data.

3. The method of claim 1, the method further comprising storing the usage data in a distributed ledger.

4. The method of claim 1, wherein predicting the future consumption of the type of item comprises:
identifying one or more enterprises located in the geographic area; and
predicting consumption of the type of item with respect to at least one of the one or more enterprises.

5. The method of claim 1, wherein generating the recommended reconfiguration comprises:
receiving production data from a producer of the item;
determining a future production of the item, based on the production data; and
identifying a misalignment between the future production of the item and the predicted future consumption of the item.

6. The method of claim 1, wherein generating the recommended reconfiguration comprises:
receiving distribution data from a distributor of the item;
determining a future volume of the item for the geographic area, based on the distribution data; and
identifying a misalignment between the future volume of the item and the predicted future consumption of the item.

7. The method of claim 1, the method further comprising:
receiving weather data for the geographic area; and
predicting future consumption of the type of item based at least in part on the weather data.

8. A computer program product comprising one or more computer-readable storage media collectively containing computer-readable program code that, when executed by operation of one or more computer processors, performs an operation comprising:
updating, by operation of one or more processors, a cognitive model to predict future consumption of items when new data is received, using machine learning;
receiving, by operation of the one or more processors, usage data collected from at least one sensor in a receptacle located in a physical location, wherein:
the usage data indicates consumption of an item,
the receptacle is used for depositing items for disposal, and
the usage data comprises one or more images captured by the at least one sensor;
evaluating, by operation of the one or more processors, using the cognitive model, the one or more images using one or more image recognition techniques to determine a type of the item and a quantity of the item;
aggregating, by operation of the one or more processors, the usage data within a predefined cluster, wherein the predefined cluster corresponds to a geographic area, and wherein the usage data is anonymized prior to evaluation such that the usage data indicates the geographic area and does not identify the at least one sensor;
receiving, by operation of the one or more processors, social media data indicating a scheduled future event, timing of the scheduled future event, a type of the scheduled future event, and a number of participants for the scheduled future event;
predicting, by operation of the one or more processors, future consumption of the type of item by the cognitive model, based at least in part on evaluating the aggregated usage data and the social media data indicating the scheduled future event using the cognitive model;
generating, by operation of the one or more processors, a recommended reconfiguration of one or more aspects of at least one of production or distribution for the item to reduce misalignments between the predicted future consumption and planned supply for the geographic area; and
automatically facilitating implementation of the recommended reconfiguration, by operation of the one or more processors, to reduce the misalignments, comprising modifying one or more distribution plans to change a quantity of the item that will be sent to one or more enterprises in the geographic area.

9. The computer program product of claim 8, the operation further comprising:
receiving unstructured data from one or more social media platforms;
correlating the unstructured data with the aggregated usage data; and
predicting future consumption of the type of item based at least in part on the correlated unstructured data.

10. The computer program product of claim 8, wherein the at least one sensor includes one or more of (i) a weight sensor, (ii) an image sensor, or (iii) a radio sensor.

11. The computer program product of claim 8, wherein predicting the future consumption of the type of item comprises:
identifying one or more enterprises located in the geographic area; and
predicting consumption of the type of item with respect to at least one of the one or more enterprises.

12. The computer program product of claim 8, wherein generating the recommended reconfiguration comprises:
receiving production data from a producer of the item;
determining a future production of the item, based on the production data; and
identifying a misalignment between the future production of the item and the predicted future consumption of the item.

13. The computer program product of claim 8, wherein generating the recommended reconfiguration comprises:
receiving distribution data from a distributor of the item;
determining a future volume of the item for the geographic area, based on the distribution data; and
identifying a misalignment between the future volume of the item and the predicted future consumption of the item.

14. The computer program product of claim 8, the operation further comprising:
receiving weather data for the geographic area; and
predicting future consumption of the type of item based at least in part on the weather data.

15. A system comprising:
one or more computer processors; and
one or more memories collectively containing one or more programs which when executed by the one or more computer processors performs an operation, the operation comprising:
updating, by operation of one or more processors, a cognitive model to predict future consumption of items when new data is received, using machine learning;
receiving, by operation of the one or more processors, usage data collected from at least one sensor in a receptacle located in a physical location, wherein:
the usage data indicates consumption of an item,
the receptacle is used for depositing items for disposal, and
the usage data comprises one or more images captured by the at least one sensor;
evaluating, by operation of the one or more processors, using the cognitive model, the one or more images using one or more image recognition techniques to determine a type of the item and a quantity of the item;
aggregating, by operation of the one or more processors, the usage data within a predefined cluster, wherein the predefined cluster corresponds to a geographic area, and wherein the usage data is anonymized prior to evaluation such that the usage data indicates the geographic area and does not identify the at least one sensor;
receiving, by operation of the one or more processors, social media data indicating a scheduled future event, timing of the scheduled future event, a type of the scheduled future event, and a number of participants for the scheduled future event;
predicting, by operation of the one or more processors, future consumption of the type of item by the cognitive model, based at least in part on evaluating the aggregated usage data and the social media data indicating the scheduled future event using the cognitive model;
generating, by operation of the one or more processors, a recommended reconfiguration of one or more aspects of at least one of production or distribution for the item to reduce misalignments between the predicted future consumption and planned supply for the geographic area; and
automatically facilitating implementation of the recommended reconfiguration, by operation of the one or more processors, to reduce the misalignments, comprising modifying one or more distribution plans to change a quantity of the item that will be sent to one or more enterprises in the geographic area.

16. The system of claim 15, the operation further comprising:
receiving unstructured data from one or more social media platforms;
correlating the unstructured data with the aggregated usage data; and
predicting future consumption of the type of item based at least in part on the correlated unstructured data.

17. The system of claim 15, wherein predicting the future consumption of the type of item comprises:
identifying one or more enterprises located in the geographic area; and
predicting consumption of the type of item with respect to at least one of the one or more enterprises.

18. The system of claim 15, wherein generating the recommended reconfiguration comprises:
receiving production data from a producer of the item;
determining a future production of the item, based on the production data; and
identifying a misalignment between the future production of the item and the predicted future consumption of the item.

19. The system of claim 15, wherein generating the recommended reconfiguration comprises:
receiving distribution data from a distributor of the item;
determining a future volume of the item for the geographic area, based on the distribution data; and
identifying a misalignment between the future volume of the item and the predicted future consumption of the item.

20. The system of claim 15, the operation further comprising:
receiving weather data for the geographic area; and
predicting future consumption of the type of item based at least in part on the weather data.

* * * * *